United States Patent
Smith, III

(10) Patent No.: US 6,237,632 B1
(45) Date of Patent: May 29, 2001

(54) UNDERSEA HYDRAULIC COUPLING MEMBER WITH PRIMARY AND SECONDARY POPPET VALVES

(75) Inventor: Robert E. Smith, III, Missouri City, TX (US)

(73) Assignee: National Coupling Company Inc., Stafford, TX (US)

( * ) Notice: Subject to any disclaimer, the term of this patent is extended or adjusted under 35 U.S.C. 154(b) by 0 days.

(21) Appl. No.: 09/584,163

(22) Filed: May 30, 2000

(51) Int. Cl.[7] .................................................. F16L 37/28
(52) U.S. Cl. ...................................... 137/614.19; 137/613
(58) Field of Search ........................ 137/614.05, 614.04, 137/613, 614.19; 251/149.6

(56) References Cited

U.S. PATENT DOCUMENTS

| | | |
|---|---|---|
| 2,471,237 | 5/1949 | Pasturczak . |
| 2,727,761 | 12/1955 | Elliott et al. . |
| 2,854,258 | 9/1958 | Hickey et al. . |
| 2,966,371 | 12/1960 | Bruning . |
| 3,348,575 | 10/1967 | Simak . |
| 3,431,942 | * 3/1969 | Kopaska ........................ 137/614.05 |
| 3,550,624 | 12/1970 | Johnson . |
| 3,646,964 | * 3/1972 | Stratman ...................... 137/614.05 X |
| 3,851,666 | * 12/1974 | Hammond ...................... 251/149.6 X |
| 4,506,863 | 3/1985 | Quin et al. . |
| 4,582,295 | 4/1986 | Kugler et al. . |
| 4,745,948 | 5/1988 | Wilcox et al. . |
| 4,799,512 | 1/1989 | Sarson . |
| 5,063,965 | 11/1991 | Wilcox . |
| 5,360,035 | 11/1994 | Smith . |
| 5,365,972 | 11/1994 | Smith, III . |
| 6,009,902 | * 1/2000 | Troiani et al. ................ 251/149.6 X |

* cited by examiner

Primary Examiner—Kevin Lee
(74) Attorney, Agent, or Firm—Fulbright & Jaworski

(57) ABSTRACT

An undersea hydraulic coupling member is disclosed having a primary poppet valve and a secondary poppet valve to improve reliability against leakage when the coupling members are separated. A spring extends between the first poppet valve and the actuator for the second poppet valve. The secondary poppet valve remains closed unless the first poppet valve is fully opened, so that debris or other material that could prevent sealing of the first poppet valve will not cause leakage of hydraulic fluid through the second poppet valve.

18 Claims, 2 Drawing Sheets

UNDERSEA HYDRAULIC COUPLING MEMBER WITH PRIMARY AND SECONDARY POPPET VALVES

BACKGROUND OF THE INVENTION

1. Field of the Invention

The present invention relates generally to hydraulic couplings used in undersea drilling and production applications. More particularly, the invention involves an undersea hydraulic coupling member with a primary poppet valve and a secondary poppet valve for higher reliability against leakage when the coupling is not mated.

2. Description of Related Art

Subsea hydraulic couplings are old in the art. The couplings generally consist of a male member and a female member, with soft seals positioned within the female member to seal the junction between the male and female members. The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion, or probe, at one end having a diameter approximately equal to the diameter of the large bore of the female portion of the coupling. The male member also includes a connection at its other end to facilitate connection to hydraulic lines. When the cylindrical portion of the male member is inserted into the large bore of the female member, according to the various embodiments of the device, the soft seals, or O-rings, either about the end or face of the male member or engage the cylindrical probe wall about its outer circumference. The hydraulic fluid is then free to flow through the female and male members of the coupling and seals prevent that flow from escaping about the joint and the coupling.

Poppet valves may be installed in the female member and in the male member of the coupling. Each poppet valve closes when the coupling is broken so as to prevent fluid from leaking out of the system of which the coupling is a part. Springs or other bias means have been used to urge the poppet valves into the normally closed position.

Recently, one or more pressure energized metal seals have been used in undersea hydraulic couplings of the foregoing type. For example, U.S. Pat. Nos. 4,694,859 and 5,762,106 to Robert E. Smith III, assigned to National Coupling Company, Inc. show undersea hydraulic couplings with radial metal seals that engage the diameter of the probe or male member.

In subsea hydraulic systems of the foregoing type, it is important to prevent or minimize leakage of hydraulic fluid from each of the couplings and hydraulic systems of which the couplings are a part. It also is important to prevent or minimize the entry of seawater into the couplings and hydraulic systems. While pressure energized metal seals have been effectively used to stop leakage when the couplings are mated, it is nevertheless possible that leakage may occur around the poppet valve of one or both coupling members when they are not mated. For example, debris external to the hydraulic system, or in the hydraulic system, may become lodged in or around the poppet valve when the coupling members are separated. If that occurs, there is a potential for leakage of hydraulic fluid through the coupling member because the poppet valve has not closed and sealed properly against the valve seat in the coupling member.

Leakage of hydraulic fluid from one or both coupling members poses potential serious environmental risks as well as loss of subsea system hydraulic function. Therefore, efforts have been made to reduce or eliminate leakage by assuring that the valves are closed and sealed when the coupling members are not mated. For example, U.S. Pat. Ser. No. 09/293,554 to Robert E. Smith III assigned to National Coupling Company, Inc. discloses and undersea hydraulic coupling that includes a larger spring to help urge the poppet valve closed against the seal seat and prevent or minimize leakage when the coupling members are disconnected.

It is desirable to provide an improved apparatus for ensuring that hydraulic fluid does not leak out of one or both coupling members when coupling members are separated. It is also desirable to provide an undersea hydraulic coupling with higher reliability for shutting off the flow of hydraulic fluid when the coupling members are disconnected subsea.

SUMMARY OF THE INVENTION

The present invention resides in an undersea hydraulic coupling of the foregoing type including a male member, or probe, having a primary poppet valve and a secondary poppet valve to provide higher reliability against leakage of hydraulic fluid when the male and female coupling members are separated. The primary, or first poppet valve is urged into the closed position by a first spring. A first valve actuator urges the first poppet valve open and compresses the first spring. The secondary poppet valve, which is urged into the closed position by a second spring, is opened by a second valve actuator in response to compression of the first spring. The first spring is connected between the first valve and the second actuator. The pair of valves may be positioned in either the male or female coupling member. The secondary poppet valve may have a larger diameter, and be positioned in a larger diameter section of the coupling member bore or, if desired, both the primary and secondary poppet valves may positioned in the same diameter bore.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF PREFERRED EMBODIMENTS

Figure 1:
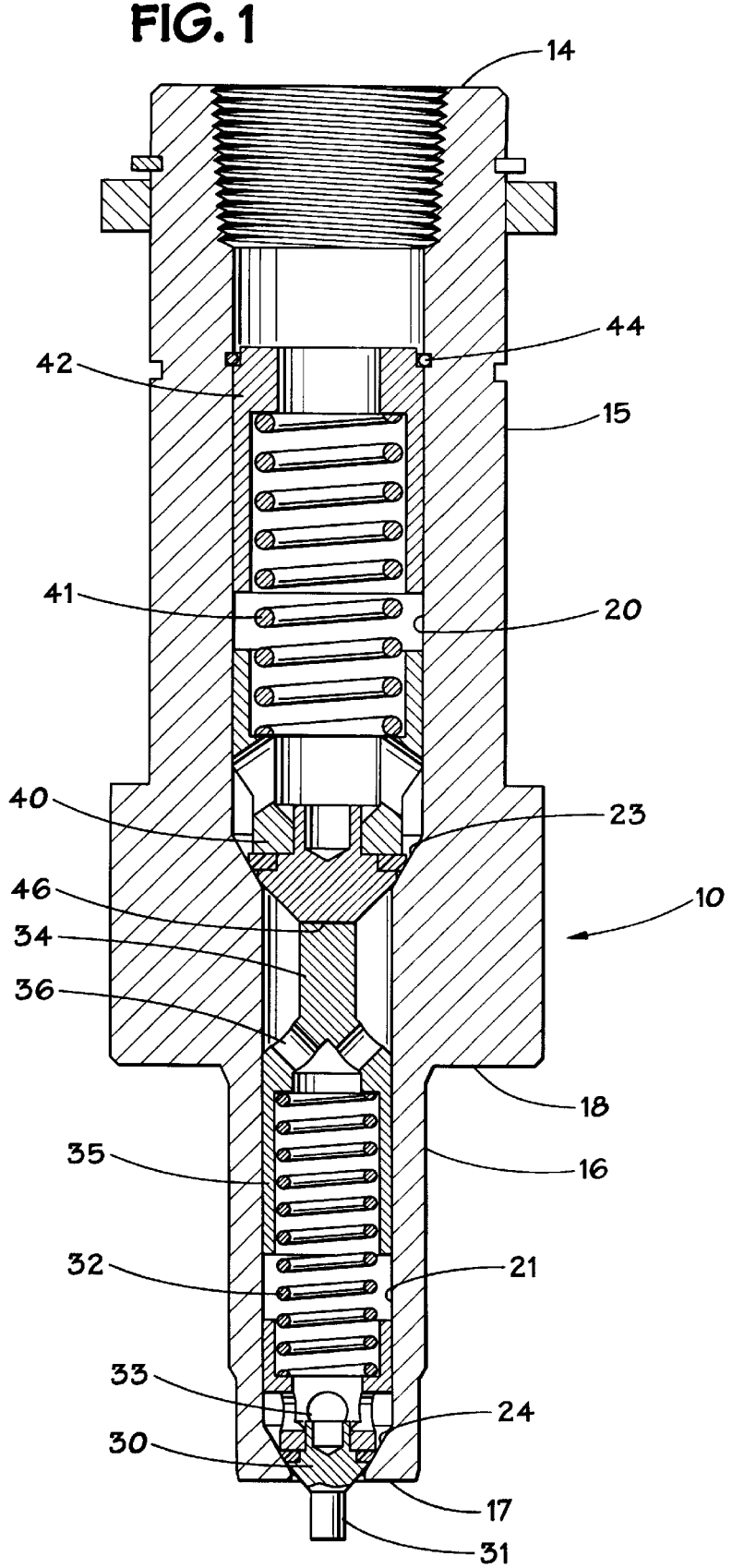
FIG. 1 is a cross-section view of a male member of the coupling according to a first preferred embodiment of the present invention.

FIG. 1 is a cross-section view of a male coupling member 10 including a cylindrical body section 15 which terminates at shoulder 18, and a cylindrical probe section 16. The probe section 16 preferably has a stepped external diameter and terminates at leading face 17 of the male coupling member. The male member preferably has a cylindrical bore therethrough with a first section 21 extending to conical valve seat 24 adjacent the leading face, and a second, smaller diameter section 20 extending to conical valve seat 23.

The first, or primary, poppet valve 30 of the male member is slideably positioned within the first section 21 of the bore. The poppet valve includes a cylindrical, hollow valve body with apertures 33. The face of the valve is generally conical in shape and is dimensioned to seat and seal with valve seat 24. First spring 32 urges the first poppet valve into the closed position against the valve seat. First valve actuator 31 extends from the first poppet valve. Preferably, the actuator 31 is a stem extending longitudinally from the apex of the conical valve face.

The first spring 32 extends between and connects the first poppet valve 30 and the second actuator 34. The second actuator slides in the smaller section 21 of the bore and preferably includes a sleeve shaped body 35 with a conical face having apertures 36 and a stem extending from the apex of the conical face of the actuator. In the embodiment shown in FIG. 1, when the first poppet valve 30 is closed and sealed against the first valve seat 24, first spring 32 urges the second actuator longitudinally to a position adjacent, or abutting, leading face 46 of the second poppet valve 40. In the first embodiment, the second poppet valve has a diameter greater than the first poppet valve and is slideably positioned in the second section 20 of the coupling bore. The second spring 41 urges the second poppet valve 40 into the closed or sealed position against seal seat 23. The second spring 41 is anchored by spring collar 42 which is held by clip 44 in the wall of the second section 20 of the bore. In the first embodiment, the second spring 41 has a greater diameter and a greater force constant then the first spring 32.

When the coupling member according to the first embodiment of the invention is mated with the opposing coupling member, first actuator 31 is moved axially or longitudinally to open the first poppet valve 30 and compress the first spring 32. Compressing the first spring moves the second actuator longitudinally or axially against the leading face 46 of the second poppet valve to urge the second poppet valve off valve seat 23 This compresses the second spring 41. When the second poppet valve 40 opens, it slides axially until it touches the spring collar 42.

As shown in the first embodiment, the second poppet valve remains sealed to prevent leakage of hydraulic fluid unless the first poppet valve is fully opened. For example, the first poppet valve may be open slightly, and will not be sealed, due to debris lodged in the space between the first poppet valve and valve seat. If this occurs, the second poppet valve will be sealed to prevent leakage of hydraulic fluid through the coupling member and remain sealed unless the first actuator urges the first poppet valve open and the first spring, between the first poppet valve and the second actuator, is compressed sufficiently to open the second poppet valve. The second poppet valve remains closed and sealed even if there is leakage because the first poppet valve is slightly open.

In a second preferred embodiment of the present invention, the second poppet valve is positioned within a sleeve in the coupling member bore. As shown, male coupling member 50 has a body section 52 and a probe section 53 terminating at leading face 54. The internal bore has a first section 57 and a second section 56 having a diameter greater than the first section. Conical valve seat 58 is located adjacent the leading face 54. First poppet valve 59 slides within the first section 57 of the bore and has an actuator 60 extending from its conical face. First spring 61 urges the first poppet valve into a closed position against seat 58. The first poppet valve has valve body aperture 62 extending there through. First spring 61 is connected between the first poppet valve 59 and the second actuator 63. The second actuator 63 has a sleeve shaped body 64 and a conical face with apertures 65 and a stem extending therefrom to abut or touch the face 71 of the second poppet valve. As in the first embodiment, the second actuator may abut or be spaced from the face 71 of the second poppet valve when the first poppet valve is sealed.

Figure 2:
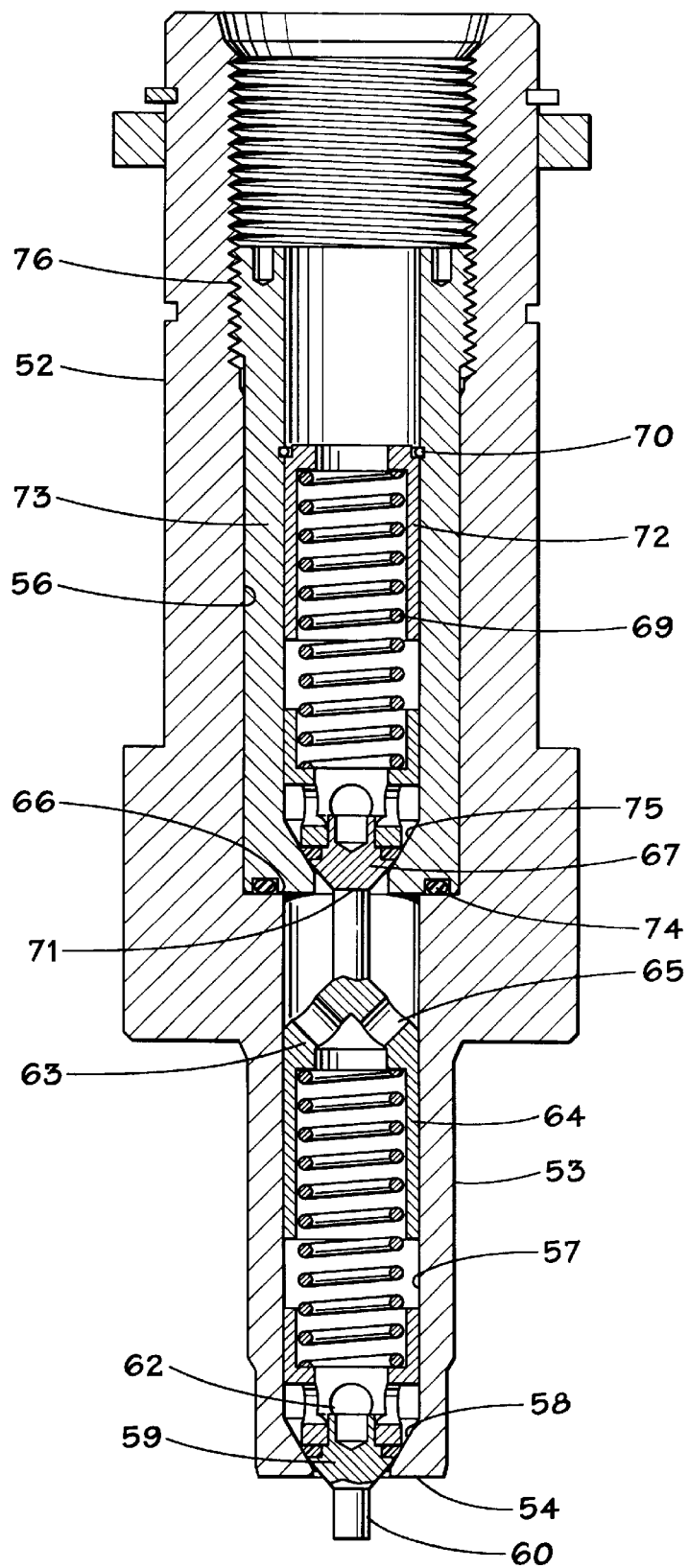
FIG. 2 is a cross-section view of a male member of the coupling according to a second preferred embodiment of the present invention.

The large diameter section 56 of the bore terminates at shoulder 66. Preferably, an O-ring 74 or other seal seals the junction between the shoulder 66 and the sleeve 73. The sleeve 73 has an internal bore for receiving the second poppet valve 67 which, in the normally closed position, seals with second valve seat 75 which is preferably conical in shape. The second poppet valve is urged against seat 75 by second spring 69 which is held in place by spring collar 72 and clip 70. In the embodiment of FIG. 2, the sleeve 73 is held in the second section of the bore by threads 76.

Accordingly, the second embodiment of the invention provides an assembly that is insertable into the bore of the coupling member, allowing both the first and second poppet valves to be the same size to reduce the axial force to open the poppet valves in certain applications. As in the first embodiment, the secondary poppet valve remains closed to prevent leakage through the coupling, unless the first poppet valve is fully opened and the first spring is fully compressed. The invention improves the reliability of subsea hydraulic coupling members and prevents leakage by providing a backup or secondary poppet valve. If debris or other material prevents the first poppet valve from fully closing and sealing against the valve seat, the secondary or backup poppet valve remains closed to prevent leakage of hydraulic fluid or entry of seawater into the hydraulic system of which the coupling is a part. The present invention may be used in either the male or female coupling member or both coupling members if desired.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling member comprising:
   (a) a body having a cylindrical bore extending therethrough;
   (b) a first poppet valve in the cylindrical bore, a first spring urging the first poppet valve into the closed position and a first actuator movable extending from the first poppet valve to urge the first poppet valve open and compress the first spring; and
   (c) a second poppet valve in the cylindrical bore, a second spring urging the second poppet valve into the closed position and a second actuator movable in response to compression of the first spring to urge the second poppet valve open and compress the second spring.

2. The undersea hydraulic coupling member of claim 1 wherein the second actuator is detached from the second poppet valve.

3. The undersea hydraulic coupling member of claim 1 wherein the cylindrical bore has a first section and a second section with a larger diameter than the first section, and wherein the first poppet valve is in the first section and the second poppet valve is in the second section.

4. The undersea hydraulic coupling member of claim 1 wherein the second spring is larger than the first spring.

5. The undersea hydraulic coupling member of claim 1 wherein the first poppet valve has a conical valve face and the first actuator extends from the apex of the conical valve face.

6. The undersea hydraulic coupling member of claim 1 wherein the second poppet valve has a conical valve face and the second actuator abuts the conical valve face.

7. An undersea hydraulic coupling member comprising:
(a) a body having a bore with a first section with a first seal seat adjacent a first end thereof and a second section having a larger diameter than the first section, and a second seal seat between the first section and second section;
(b) a first poppet valve slideable in the first section of the bore, a first spring urging the first poppet valve closed against the first seal seat, and a first actuator extending from the first poppet valve to urge the first poppet valve open in response to axial force applied to the first actuator; and
(c) a second poppet valve slideable in the second section of the bore, a second spring urging the second poppet valve closed against the second seal seat, and a second actuator slideable in the first section of the bore to urge the second poppet valve open in response to axial force applied by the first spring to the second actuator.

8. The undersea hydraulic coupling member of claim 7 wherein the second actuator abuts the second poppet valve to open the second poppet valve in response to axial force applied to the second actuator by the first spring.

9. The undersea hydraulic coupling member of claim 7 wherein the second actuator is detached from the second poppet valve.

10. The undersea hydraulic coupling member of claim 7 wherein the second spring has a greater diameter than the first spring.

11. The undersea hydraulic coupling member of claim 7 further comprising a sleeve in the second section of the bore, the sleeve having a seal seat at a first end thereof, the second poppet valve slideable in the sleeve, the second spring urging the second poppet valve closed against the seal seat in the sleeve.

12. An undersea hydraulic coupling member comprising a connector with an internal bore, first and second poppet valves for closing the bore, and first and second actuators for opening the first and second poppet valves respectively in response to axial force applied to each actuator, the first actuator integrally connected to the first poppet valve, and a compressible spring connecting the first poppet valve to the second actuator, compression of the first spring urging the second actuator to open the second poppet valve.

13. The undersea hydraulic coupling member of claim 12 further comprising a second compressible spring connected to the second poppet valve.

14. The undersea hydraulic coupling member of claim 12 further comprising a sleeve insertable into the internal bore, the second valve slideable in the sleeve.

15. The undersea hydraulic coupling member of claim 12 wherein the internal bore is stepped with a first section where the first poppet valve is positioned and a second section where the second poppet valve is positioned.

16. The undersea hydraulic coupling member of claim 12 wherein the second actuator is detached from the second poppet valve and abuts the second poppet valve to open the second poppet valve.

17. The undersea hydraulic coupling member of claim 12 wherein the second poppet valve remains closed unless the first poppet valve is opened at least a predetermined amount.

18. The undersea hydraulic coupling member of claim 12 wherein the first poppet valve has a smaller diameter than the second poppet valve.

* * * * *